United States Patent [19]

Mundus

[11] Patent Number: 4,983,088

[45] Date of Patent: Jan. 8, 1991

[54] APPARATUS FOR STACKING FLAT WORKPIECES ON STACKING PINS OR AN ENDLESS CONVEYING ELEMENT

[75] Inventor: Friedhelm Mundus, Lengerich, Fed. Rep. of Germany

[73] Assignee: Windmoller & Holscher, Lengerich, Fed. Rep. of Germany

[21] Appl. No.: 452,461

[22] Filed: Dec. 20, 1989

[30] Foreign Application Priority Data

Jan. 13, 1989 [DE] Fed. Rep. of Germany ....... 3900898
Mar. 23, 1989 [DE] Fed. Rep. of Germany ....... 3909700

[51] Int. Cl.[5] .............................................. B65G 57/03

[52] U.S. Cl. .................................. 414/27; 414/790.4; 414/790.8

[58] Field of Search .......................... 83/84, 86, 90, 91; 493/204; 414/790.4, 790.8, 794.4, 794.7, 27; 271/218, 903

[56] References Cited

U.S. PATENT DOCUMENTS

| | | | |
|---|---|---|---|
| 2,633,731 | 4/1953 | Friedman | 69/27 |
| 3,555,977 | 1/1971 | Saumsiegle | 414/27 X |
| 4,095,392 | 6/1978 | Van De Gent | 414/27 X |
| 4,195,960 | 4/1980 | Schulze | 414/27 X |
| 4,371,365 | 2/1983 | Shingō493 | 25/ |
| 4,547,111 | 10/1985 | Achelpohl | 414/27 |

FOREIGN PATENT DOCUMENTS

| | | | |
|---|---|---|---|
| 2196943 | 5/1988 | United Kingdom | 414/794.4 |

*Primary Examiner*—Robert P. Olszewski

*Assistant Examiner*—Craig Slavin

*Attorney, Agent, or Firm*—Fleit, Jacobson, Cohn, Price, Holman & Stern

[57] ABSTRACT

An apparatus for stacking flat workpieces, which are provided with stacking holes, on stacking pins or stacking fingers of an endless flexible conveying element or of an endless conveying chain, which revolves around reversing pulleys, which conveying element or conveying chain is advanced by one step whenever a stack consisting of a predetermined number of workpieces has been formed. The apparatus includes a feeder for feeding consecutive workpieces to be stacked and a rake for pushing the workpieces onto the stacking pits or stacking fingers. The stacking fingers are mounted on elongate pedestals, which are secured to the conveying element or conveying chain and have a width which is smaller and a length which is larger than the diameter of the stacking holes. At least one substantially U-shaped carrying member, which constitutes a temporary stacking finger, is secured to a carrier and is adapted to be displayed or pivotally moved inwardly and has a cross-section which is smaller than the diameter of the stacking holes. The carrying member is movable to at least one position in which the carrying member extends around part of a stacking finger and/or around part of a pedestal and has approximately the same height as each pedestal or has preferably a smaller height than each pedestal and is vertically displaceable relative to the pedestal and to the upright stacking finger on the pedestal.

6 Claims, 10 Drawing Sheets

APPARATUS FOR STACKING FLAT WORKPIECES ON STACKING PINS OR AN ENDLESS CONVEYING ELEMENT

BACKGROUND OF THE INVENTION

1. Field of the Invention

This invention relates to an apparatus for stacking flat workpieces, which are provided with stacking holes, on stacking pins or stacking fingers of an endless flexible conveying element or of an endless conveying chain. The endless flexible conveying element or endless conveying chain revolves around reversing pulleys, which conveying element or conveying chain is advanced by one step whenever a stack consisting of a predetermined number of workpieces has been formed. The apparatus includes a feeder for feeding consecutive workpieces to be stacked and means for pushing the workpieces onto the stacking pins or stacking fingers.

2. Description of the Prior Art

Apparatuses known from U.S. Pat. Nos. 2,633,731 and 4,371,365 require interruption of the feeding of the workpieces by the performance of so-called nonfeeding intervals whenever a stack consisting of a predetermined number of workpieces has been formed on the stacking pins, by which the stacks are retained to depend freely across one side of the conveying element. During such a non-feeding interval the conveying element is advanced by one step, the stack which has just been formed is conveyed out of the stacking station, and a new pair of stacking pins are moved into the stacking station before the feeding and stacking of workpieces is resumed. The short interruption of the feeding of workpieces reduces the output of the machine and it is usually necessary to adopt relatively expensive measures in order to interrupt the process of manufacturing the workpieces and the feeding of the workpieces to the stacking station.

SUMMARY OF THE INVENTION

For this reason it is an object of the invention to provide an apparatus which is of the kind described first hereinbefore and which permits a formation of stacks on the stacking pins or stacking fingers without a need for an interruption of the feeding of the workpieces which are to be stacked while the conveying element is advanced whenever a stack has been formed.

In an apparatus of the kind described first hereinbefore that object is accomplished in accordance with the invention in that the stacking fingers or the like are mounted on elongate pedestals, which are secured to the conveying element or conveying chain and have a width which is smaller and a length which is larger than the diameter of the stacking holes. At least one substantially U-shaped carrying member, which constitutes a temporary stacking finger, is secured to a carrier and is adapted to be displaced or pivotally moved inwardly and has a cross-section which is smaller than the diameter of the stacking holes. The carrying member is movable to at least one position in which said carrying member extends around part of a stacking finger and/or around part of a pedestal and has approximately the same height as each pedestal or has preferably a smaller height than each pedestal and is vertically displaceable relative to the pedestal and to the upright stacking finger on the pedestal.

Whenever a stack consisting of a predetermined number of workpieces has been formed on one or more stacking fingers, the carrying member which constitutes a temporary stacking finger is displaced or pivotally moved inwardly so that the following workpieces will be received by said carrying member or members to form a temporary stack thereon. The conveying element or the conveying chain provided with the stacking fingers can then be advanced by one step during the time in which the temporary stack is formed on the carrying member or members and the stack which has just been formed can be removed from the stacking station during that time. When the new stacking fingers have assumed a stacking position in the stacking station, the carrying member or members is or are lowered from above onto the stacking finger or fingers so that the latter extend past the carrying member or members and the stacking holes of the workpieces of the temporary stack.

The carrying member which constitutes a temporary stacking finger can then be moved outwardly after it has been lowered below the stacking fingers to a position in which it extends around part of the pedestal. As the height of the pedestals is at least as large as the height of the carrying members, the carrying members can then be pulled out under the stack which has been placed on the stacking finger or fingers and which will then be retained only by the stacking finger or fingers and will be supported by the pedestal or pedestals in such a manner that the carrying member or members is or are clear of the stack. The carrying member or members can then be moved to its or their stand-by position and will be returned to the temporary stacking position when a new stack has been formed and must be carried off.

The conveying element which carries the pedestals provided with the stacking fingers is suitably also adapted to be raised and lowered. In that case the carrying members can be displaced or pivotally moved inwardly to a temporary stacking position in which they extend around part of the free top ends of the stacking fingers and the stacking fingers may even protrude above the top end of the carrying members. To permit the stack which has just been formed to be carried off, the conveying element may be lowered to such an extent that the stacking fingers are clear of the carrying member or members which serves or serve to form the temporary stack.

Each stack may be formed on one or two stacking fingers and in dependence thereon the stacking fingers and the U-shaped carrying members associated with the stacking fingers may be provided individually or in pairs at suitably spaced apart locations.

In accordance with a further feature of the invention the carrying member which constitutes a temporary stacking finger is secured to a piston rod, which is horizontally retractable and extensible and is associated with a cylinder, which is secured to a carriage, which is movable along vertical tracks by a fluidoperable piston cylinder unit.

The feeder for feeding the workpieces may consist of a suction belt conveyor, which comprises one or more lower conveying courses, which move over one or more suction boxes.

The means for pushing the workpieces onto the stacking fingers may consist of a rakelike pressure applying member, which is adapted to be raised and lowered between adjacent parallel courses of the suction belt conveyor.

Independent protection is claimed for an embodiment of the invention in which a pressure-applying rotor, which is polygonal in cross-section, is provided for applying sheets or lugs to the workpiece and is adapted to be intermittently rotated about its center line in step with the cyclic operation of the conveyor in angular steps corresponding to the width of one side face of the rotor and is adapted to be raised and lowered. The rotor is provided on each side face with means for retaining sheets or lugs and is formed adjacent to each corner between two adjacent side faces with grooves, which intermittently receive a cutter blade, which is provided in a cutting station and severs the sheets or lugs from a strip thereof, which has been moved onto the pressure-applying rotor. The means for retaining the sheets or lugs suitably consist of air-sucking nozzles.

In accordance with a further feature the pressureapplying rotor comprises a core and disengageable side plates, which are mounted on said core and are urged by springs against respective side faces of the core. In accordance with a further feature the core has mutually opposite parallel side faces and is formed with a bore that extends through said side faces at right angles thereto, and a spring-loaded piston is mounted in the bore and urges two side plates against said opposite side faces. The pressure-applying rotor and its core are suitably hexagonal in cross-section so that there are three pairs of mutually opposite side faces.

In a particularly desirable embodiment the pressureapplying rotor causes lugs, which have been coated with glue and formed with stacking holes, to be forced against the workpieces and be lowered further to serve as means for pushing the workpieces onto the stacking fingers. Upon the initial contact of the pressure-applying rotor with the trailing ends of the workpieces, the rotor provides the workpieces with lugs, which serve as retaining lugs during the stacking operation.

When the lugs have been adhesively joined the pressureapplying rotor further depresses the workpieces so that the latter are detached from the feeder and pushed onto the stacking fingers.

In accordance with a further feature each side plate of the pressure-applying rotor cooperates in a punching station with punching means for forming the stacking holes. A reciprocable cutting punch may be provided in the punching station and the side plates may be provided with hole-defining knife edges for cooperating with said punch.

To permit the pressure-applying rotor to be lowered so that the carrying lugs are applied to the workpieces and the workpieces to which the carrying lugs have adhesively been joined can be pushed onto the stacking fingers. A feature within the scope of the invention resides in that the pressure-applying rotor is adapted to be lowered by means of pressure-applying members, which engage the side plates at end portions thereof which axially protrude from the core.

DETAILED DESCRIPTION OF THE PREFERRED EMBODIMENTS

Figure 1:
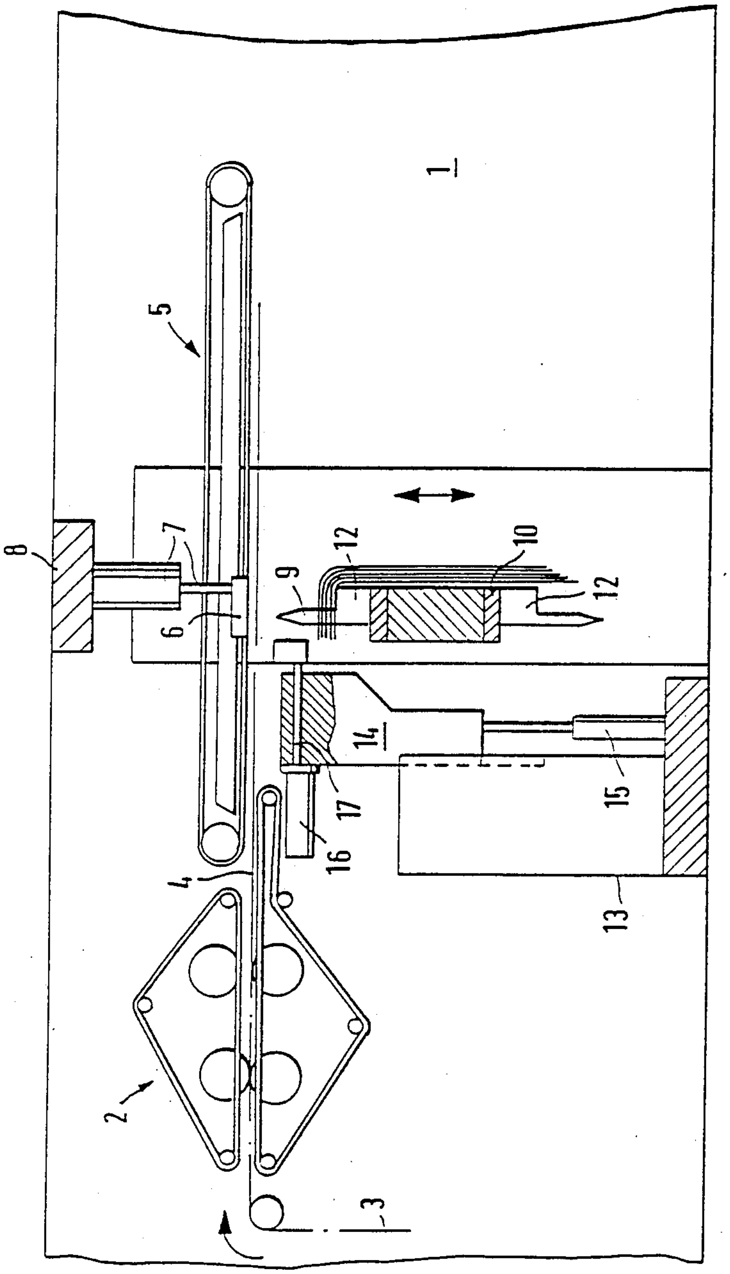
FIG. 1 is a diagrammatic side elevation showing partly in section a first embodiment of the stacking apparatus.

A web-severing mechanism 2 which is of usual type and adapted to be driven is mounted between two parallel frame side walls, only one of which, designated 1, is shown in FIG. 1.

By that web-severing mechanism, individual bags 4 are severed from a continuously received web 3, which consists of consecutive bags 4. Said bags 4 are delivered to an upper suction belt conveyor 5, which in a manner known per se consists of a plurality of juxtaposed and laterally spaced apart suction belts passing over one or more suction boxes 5*a*. A rake 6 is provided, which is operable by two piston-cylinder units 7 so that the tines of the rake move up and down in the spaces between adjacent suction belts. The piston-cylinder units 7 are secured to a crosspiece 8, which connects the two side walls, only one of which, designated 1, is shown.

Figure 2:
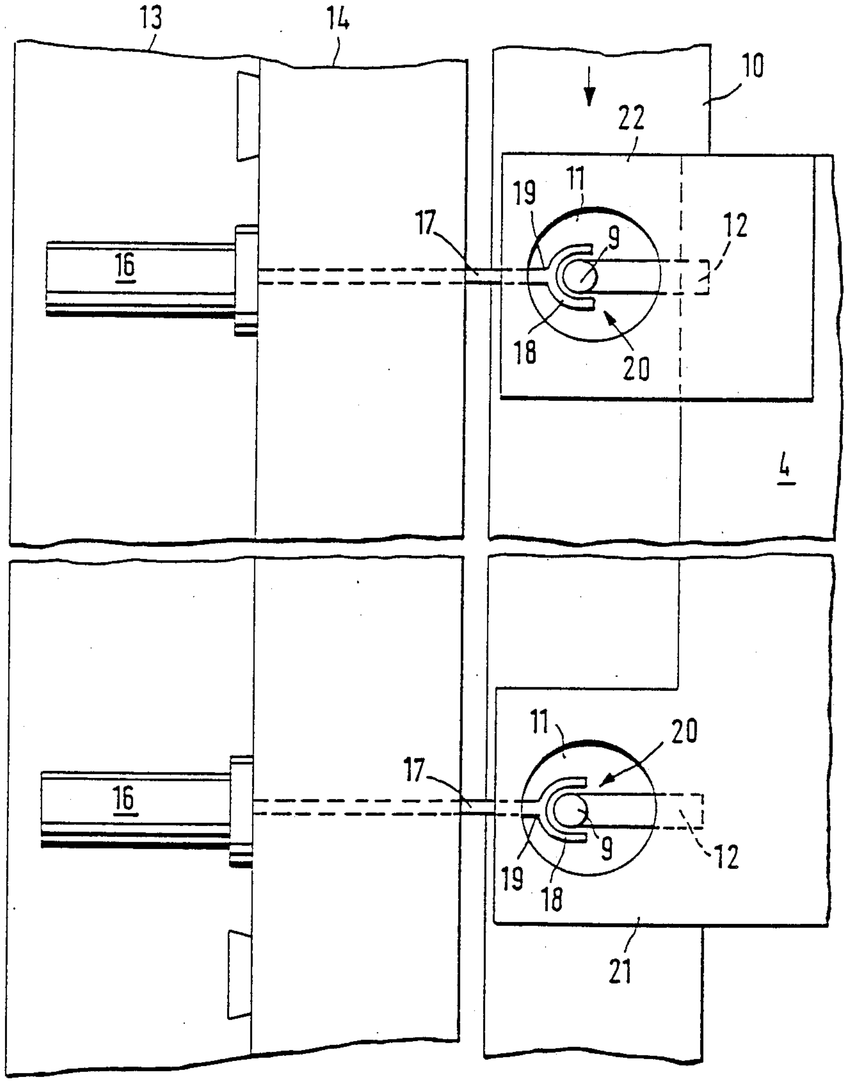
FIG. 2 is a sectional view taken on line II—II in FIG. 1*d*.

By means of the rake 6 the trailing ends of the diaper bags 4 held by the suction belts 5 are depressed and are pushed onto needles or fingers 9, which are provided on a conveyor belt 10. The reference to needles is not intended to indicate that each bag 4 is pierced but each bag has previously been provided with punched holes 11, as is shown in FIG. 2.

A saddlelike pedestal 12 is provided at the lower end of each needle or finger 9 so that the bags 4 are supported by said pedestals 12 rather than in direct contact with the belt 10. As is apparent from FIG. 1 the conveyor belt 10 extends transversely to the direction of travel of the suction belts 5. When bags in a sufficient number have been placed on a pair of fingers 9, the conveyor belt 10 must be advanced by one step to a position in which the next following pair of fingers are disposed under the rake 6.

Figure 1A:
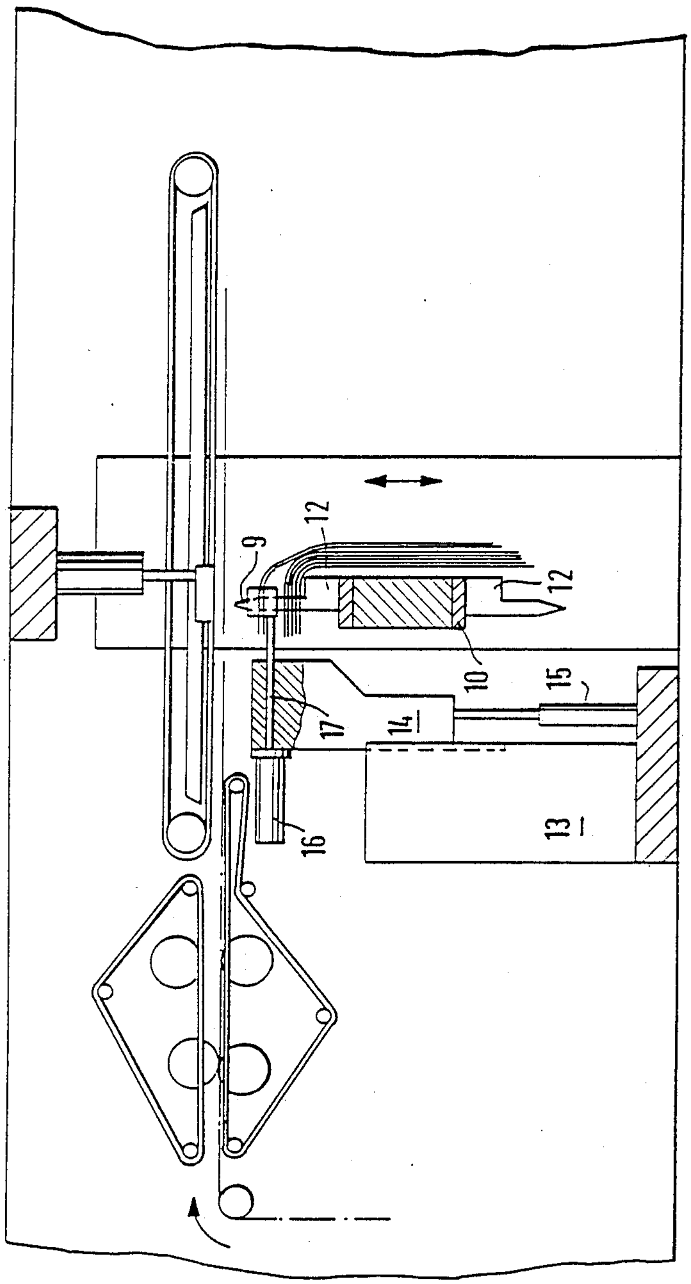
FIG. 1*a* to 1*d* show the same stacking apparatus as FIG. 1 in various operating positions.

In order to eliminate the need for an interruption of the continuous feeding of the web of consecutive bags during that advance of the conveyor belt 10, a carrier 13 is provided, which is disposed below the suction conveyor belts 5 and beside the conveyor belt 10 and carries a bracket 14, which is adapted to be lifted and lowered by means of a piston-cylinder unit 15. Two cylinders 16 are secured to the upper portion of that bracket 14 and are provided with respective piston rods 17, which extend through and protrude from the bracket 14 and have free ends, at which said piston rods 17 carry tubular carrying members 18, which extend at right angles to the piston rods 17 and are secured to them by mountings 19. At a distance from the piston rods 17, the tubular carrying members 18 are formed with slots 20. The slots 20 are so wide that the tubular members 18 may extend around part of the fingers 9 and the pedestals 12. In the position shown in FIG. 1*a* the piston rods 17 have been extended to such an extent that the tubular members 18 surround the fingers 9 and the diaper bags which are now being depressed by the rake 6 are deposited on the tubular members 18

Figure 1B:
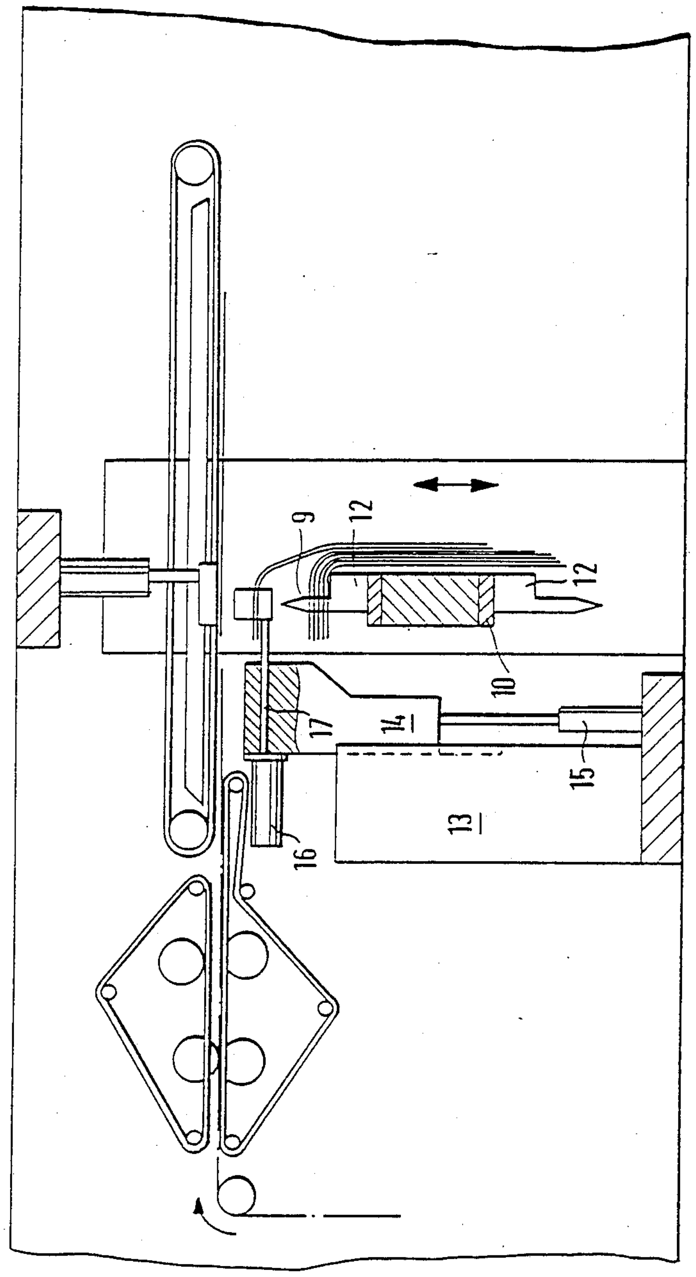
Figure 1C:
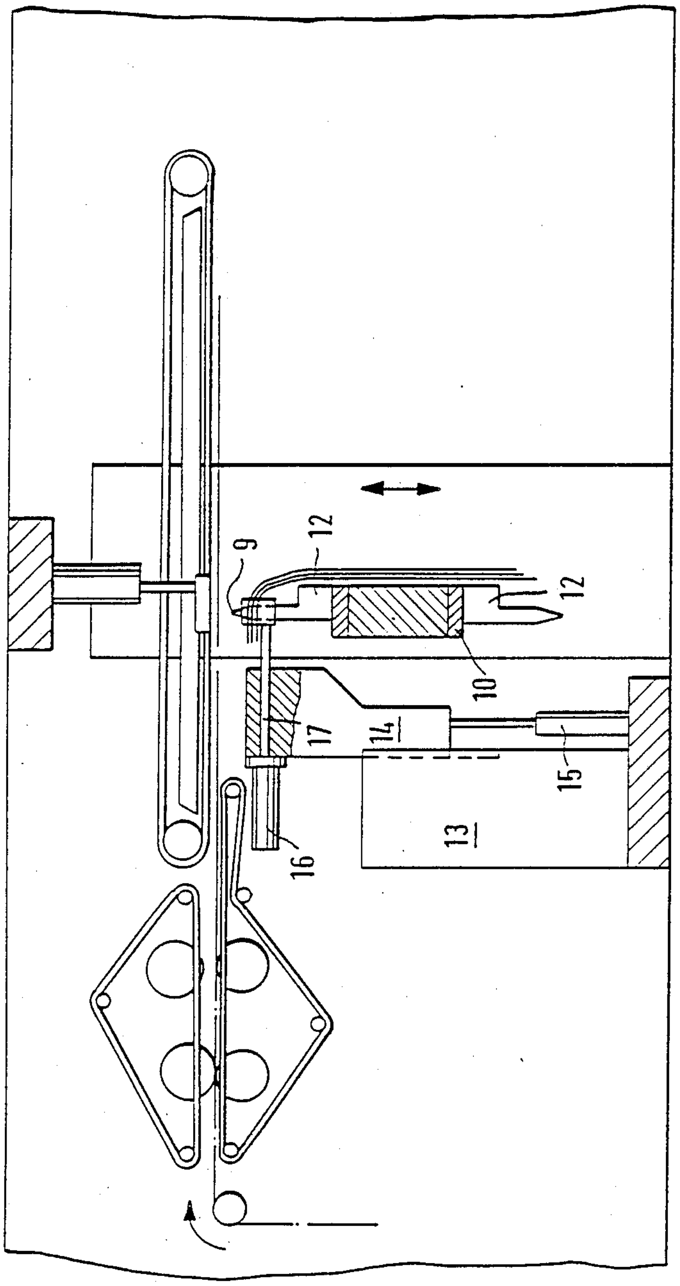
Figure 1D:
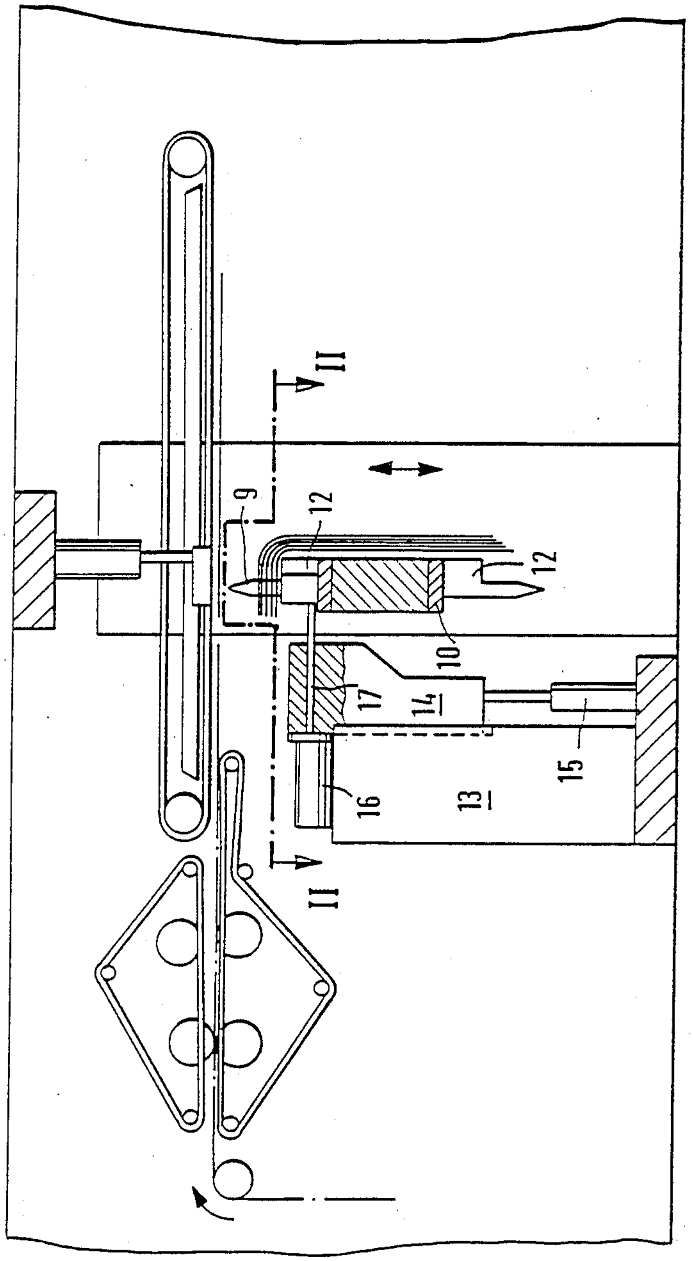

When the piston rods 17 have been extended, the conveyor belt 10 is lowered in known manner (see FIG. 1*b*) so that the fingers 9 are removed from within the tubular members 18 and the conveyor belt 10 may then be advanced by one step. Thereafter the conveyor belt 10 is raised so that the fingers 9 extend past the two tubular members 18 in the position shown in FIG. 1*c*. The bracket 14 is then lowered to the position which is shown in FIG. 1*d* and in which each bag 4 is retained by the fingers 9 and supported by the pedestals 12. Thereafter the piston rods 17 may be retracted to remove the tubular members 18 from the fingers 9. The piston-cylinder unit 15 is then operated to raise the bracket 14 so that the tubular members 18 assume their initial or stand-by position shown in FIG. 1.

In the bag shown in FIG. 2 the holes 11 are formed in laterally protruding lugs 21 and 22. On the underside of the bag 4 it is apparent that the lug 21 is integral with the bag and that the lug 22 has been attached to the bag 4, e.g., by an adhesive bond. For that purpose the embodiment shown in FIG. 3 differs from that shown in FIG. 1 in that a sheet-applying unit rather than a rake is associated with the suction belts 5. That sheetapplying applying unit is generally designated 23 and is illustrated on a larger scale in FIG. 4, which shows two crosspieces 24 and 25, by which the two side frames are interconnected and which carry a fixed frame 26. That frame comprises a top plate 27 and a rear plate 28, which is angled to have one bend. A cutting device 29 and a punching device 30 are mounted on the rear plate 28. Two side plates 31 and 32 depend from the top plate 27 at right angles thereto. Two stub shafts 33 and 34 are rotatably mounted in the side plates 31 and 32. The stub shaft 34 is adapted to be driven by a motor 35 and is provided with a vacuum port 36, which is known per se. The adjacent ends of the stub shafts 33 and 34 are secured to end plates 37 and 38, which constitute parts of a hexagonal core 39. By means of the vacuum port 36 and the line 40 a cavity formed in that core 39 can be connected to a vacuum source, which is not shown.

Side plates 41 are mounted on the side faces of the core 39. Each pair of mutually opposite ones of said side plates, designated 41' and 41", are urged against the adjacent side faces of the core 39 by a spring 42, which is associated with both side plates. For that purpose the side plate 41" is welded to a tubular member 43, which is provided with an inwardly directed annular flange 44 that is remote from the side plate 41" and is formed with a bore. A rod 45 is secured at one end to the side plate 41' and extends through the bore in the flange 45 and is provided at its other end with an abutment member 46. The spring 42 bears at one end on the abutment member 46 and at the other end on the inner portion of the flange 44.

Figure 6:
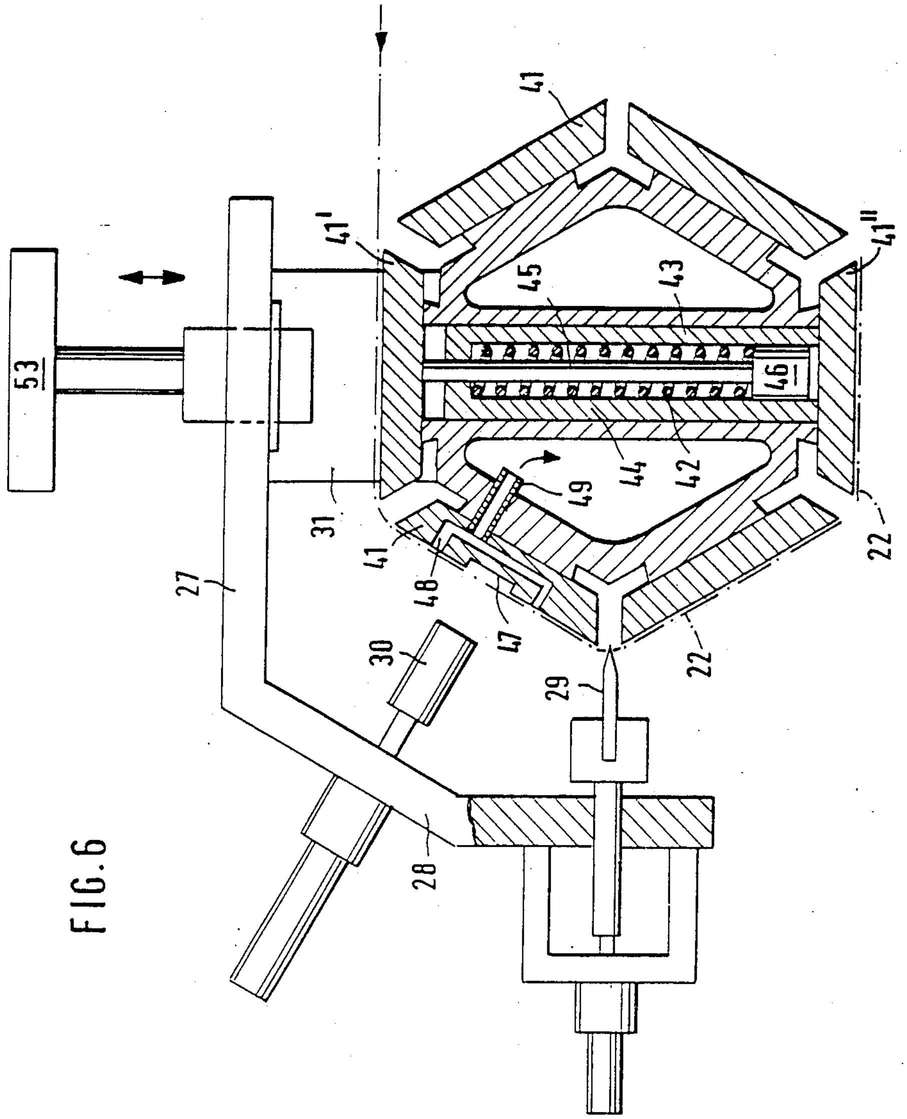
FIG. 6 is a sectional view taken on line VI—VI in FIG. 4.

The mutually opposite side plates 41 of each other pair thereof are interconnected and urged against the core 39 by similar means. The tubular members 43 and rods 45 required for that purpose are laterally spaced apart in the direction of the axis of rotation of the core 39. As is apparent from FIG. 6, the side plate 41 has a recess 47 and the punch of the punching device 30 is movable into said recess to punch the holes 11 into the lugs 22. To ensure that the lugs 22 will be held on the side plates 41 (see FIG. 2), said side plates 41 are formed with bores, which communicate through tubular members 49 with the cavity that is formed in the core 39. The tubular members 49 extend through the shell of the core 39 and are sealingly guided therein.

Figure 3:
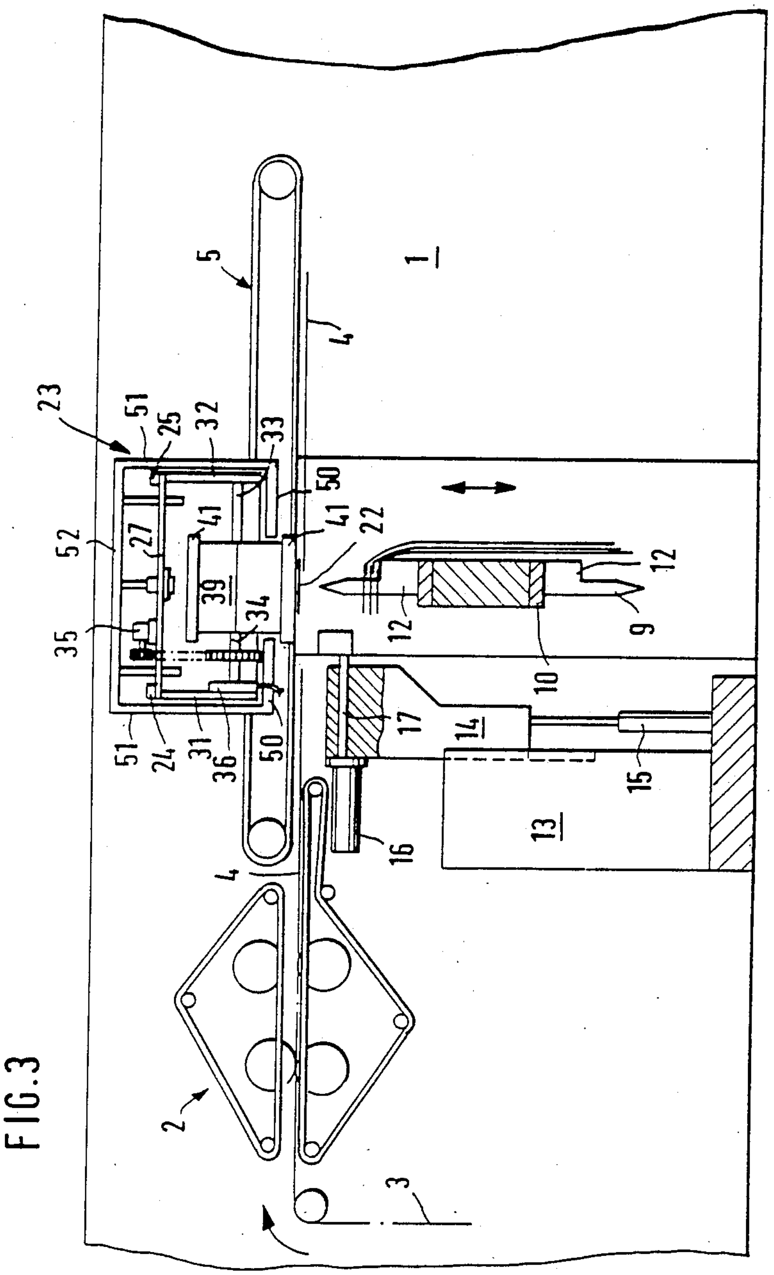
FIG. 3 is a view that is similar to FIG. 1 and shows a second embodiment of the stacking apparatus.

As is apparent from FIG. 4, each side plate 41 protrudes from both ends of the core 39 so that each side plate can be depressed by pressure-applying beams 50 in such a manner that the lug which has been received by that segment 41 is initially forced against the trailing end of a bag 4 and is subsequently pushed together with said bag onto a pair of fingers 9 (see FIG. 3). It will be understood that the lugs 21 have previously been coated with glue by a glue applicator, which is not shown. Just like the cutting device 29 and the punching device 30, the glue applicator might be mounted on the angled rear plate 28. As is apparent from FIG. 4 the pressure-applying means 50 are firmly connected to side arms 51, which are secured to a horizontal carrier 52. That horizontal carrier 52 is raised and lowered a required by a piston-cylinder unit 53, which is secured to the plate 27. For an improved guidance, two rods 54 and 55 are connected to the horizontal carrier 52 and extend through and are guided by the top plate 27.

Figure 4:
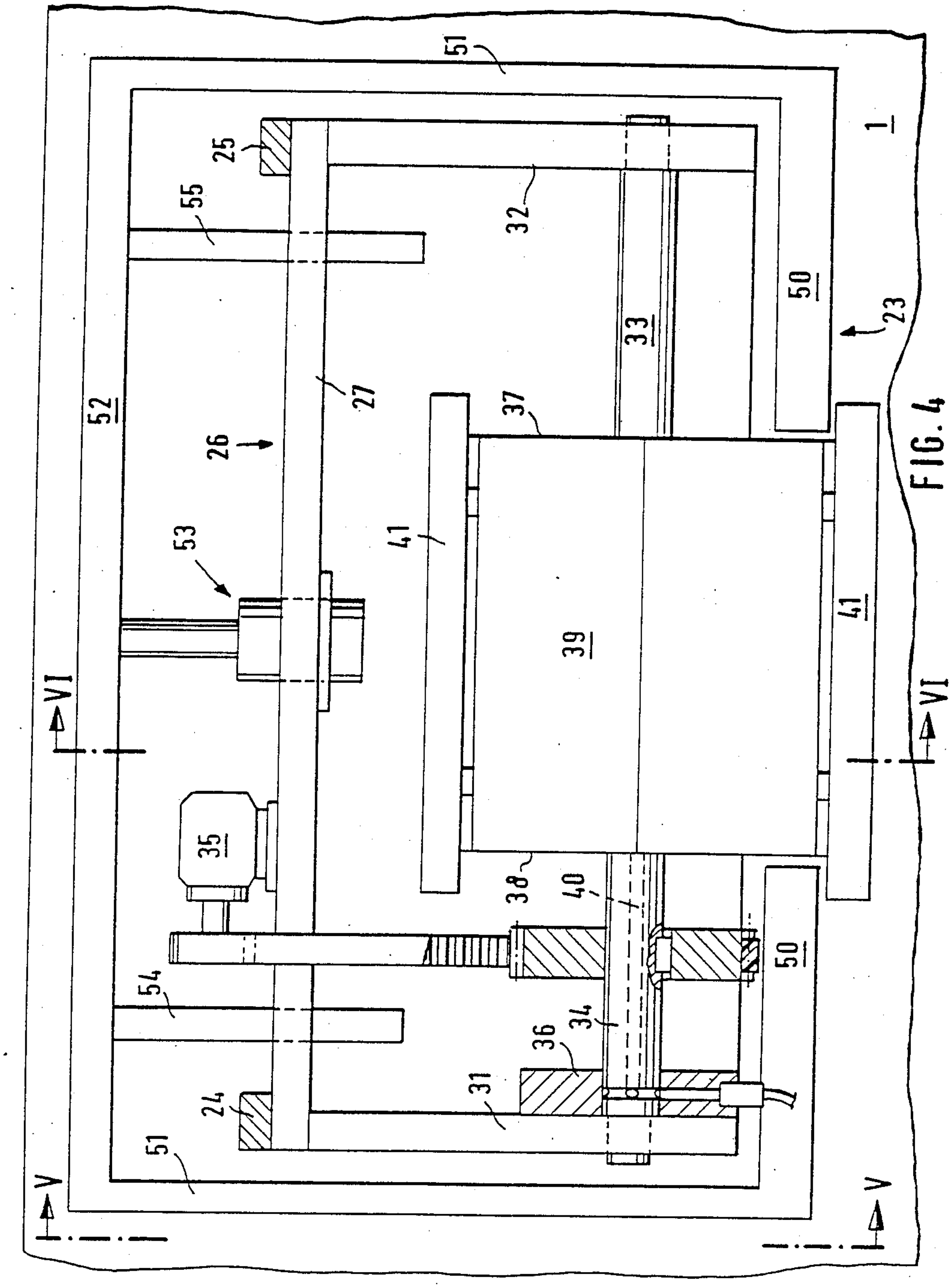
FIG. 4 shows on a larger scale the upper portion of the apparatus shown in FIG. 3.
Figure 5:
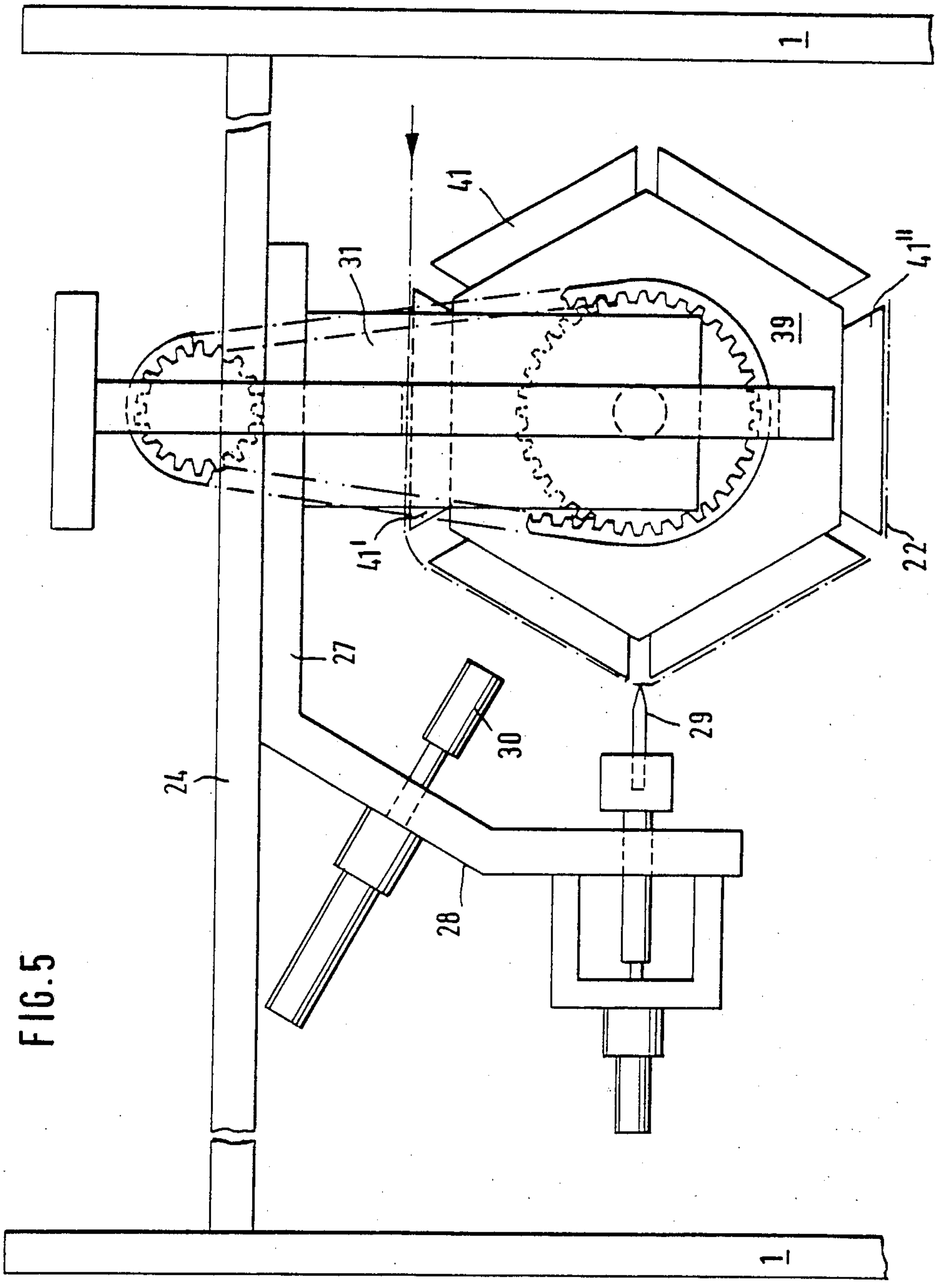
FIG. 5 is an elevation showing the apparatus illustrated in FIG. 4 and viewed in the direction of the arrows V—V in FIG. 4.

For the sake of clearness, FIG. 4 shows only those two side plates 41 which at a given time are disposed at the top and bottom of the core 39.

I claim:

1. An apparatus for stacking flat workpieces provided with stacking holes, said apparatus comprising,
   - stacking pins mounted on an endless flexible conveying element revolving around reversing pulleys, said conveying element being advanced by one step whenever a stack consisting of a predetermined number of workpieces has been formed,
   - a feeder for feeding consecutive workpieces to be stacked,
   - means for pushing the workpieces onto said stacking pins,
   - said stacking pins being mounted on elongate pedestals, said elongate pedestals being secured to the conveying element and having a width smaller and a length larger than a diameter of the stacking holes,
   - at least one substantially U-shaped carrying member forming a temporary stacking finger being secured to a carrier and being adapted to be moved inwardly and having a cross-section smaller than the diameter of the stacking holes, and
   - said carrying member being movable to at least one position where said carrying member extends around part of a stacking pin and having at most the same height as each pedestal and being vertically displaceable relative to ..the pedestal and to the upright stacking pin on the pedestal.

2. An apparatus according to claim 1, further comprising means for raising and lowering said conveying element.

3. An apparatus according to claim wherein said stacking pins and said U-shaped carrying members are provided in pairs.

4. An apparatus according to claim 1, wherein said carrying member is secured to a piston rod, said piston rod being horizontally retractable and extensible and is associated with a cylinder secured to a carriage, said carriage being movable along vertical tracks by a fluid-operable piston-cylinder unit.

5. An apparatus according to claim 1, wherein said feeder include a suction belt conveyor including at least one lower conveying courses moving over one or more suction boxes.

6. An apparatus according to claim 5, wherein said means for pushing the workpieces onto the stacking pins includes a rakelike pressure-applying member adapted to be raised and lowered between adjacent parallel courses of the suction belt conveyor.

* * * * *